(No Model.) 11 Sheets—Sheet 1.

H. H. BUFFUM.
BOOT OR SHOE NAILING MACHINE.

No. 459,698. Patented Sept. 15, 1891.

WITNESSES:
O. G. Bartlett.
A. D. Harrison.

INVENTOR
H. H. Buffum
by Wright Brown Crosby
attys.

(No Model.) 11 Sheets—Sheet 3.
H. H. BUFFUM.
BOOT OR SHOE NAILING MACHINE.

No. 459,698. Patented Sept. 15, 1891.

WITNESSES:
C. E. Bartlett
A. D. Harmon

INVENTOR:
H. H. Buffum
by Wright Brown Horsley
attys.

(No Model.) 11 Sheets—Sheet 7.
H. H. BUFFUM.
BOOT OR SHOE NAILING MACHINE.

No. 459,698. Patented Sept. 15, 1891.

WITNESSES:
INVENTOR:

(No Model.) 11 Sheets—Sheet 8.

H. H. BUFFUM.
BOOT OR SHOE NAILING MACHINE.

No. 459,698. Patented Sept. 15, 1891.

WITNESSES:
INVENTOR:

(No Model.) 11 Sheets—Sheet 9.
H. H. BUFFUM.
BOOT OR SHOE NAILING MACHINE.
No. 459,698. Patented Sept. 15, 1891.

(No Model.) 11 Sheets—Sheet 10.

H. H. BUFFUM.
BOOT OR SHOE NAILING MACHINE.

No. 459,698. Patented Sept. 15, 1891.

WITNESSES:
O. G. Bartlett
A. D. Harmon

INVENTOR
H. H. Buffum
by Wright Brown Quimby
Attys.

(No Model.)  11 Sheets—Sheet 11.
H. H. BUFFUM.
BOOT OR SHOE NAILING MACHINE.

No. 459,698. Patented Sept. 15, 1891.

Witnesses
O. G. Bartlett
A. D. Harrison

Inventor
H. H. Buffum
by Wright Brown Kinsley
attys

UNITED STATES PATENT OFFICE.

HERBERT H. BUFFUM, OF ABINGTON, MASSACHUSETTS.

BOOT OR SHOE NAILING MACHINE.

SPECIFICATION forming part of Letters Patent No. 459,698, dated September 15, 1891.

Application filed December 6, 1890. Serial No. 373,752. (No model.)

*To all whom it may concern:*

Be it known that I, HERBERT H. BUFFUM, of Abington, in the county of Plymouth and State of Massachusetts, have invented certain new and useful Improvements in Boot or Shoe Nailing Machines, of which the following is a specification.

This invention relates to machines for automatically supplying loose nails from a reservoir or hopper to a nail-guiding throat, from which the nails are driven by a reciprocating driver; and it has for its object to provide an efficient and durable machine capable of rapidly supplying and driving nails.

The invention consists in the several improvements which I will now proceed to describe and claim.

In the accompanying drawings, forming a part of this specification, Figure 1 represents a front elevation of a machine embodying my invention. Fig. 1ª represents a modification, hereinafter referred to. Fig. 3 represents a section on line 3 3 of Fig. 1 on an enlarged scale. Fig. 3ª represents a perspective view of the flanged plate $i'$, hereinafter referred to. Fig. 11 represents a section on line 8 8, Fig. 2, showing the swinging frame in a different position from that shown in Fig. 8. Fig. 12 represents a section on line 12 12, Fig. 2, looking downwardly. Fig. 13 represents a perspective view of the ejecting device hereinafter referred to.

The same letters and numerals of reference indicate the same parts in all the figures.

In the drawings, $a$ represents the supporting standard or pedestal, on which is mounted the head or frame $a'$, supporting the operating mechanism next described.

$b$ represents a vertically-reciprocating carrier, which is fitted to move up and down in fixed guides $b'$ $b^2$, which are rigidly attached to the fixed head or frame $a'$ of the machine.

$c$ represents a driver-bar, which is fitted to reciprocate vertically in the slot or guide formed in the carrier $b$, said driver-bar being actuated by mechanism presently described.

Figure 2:
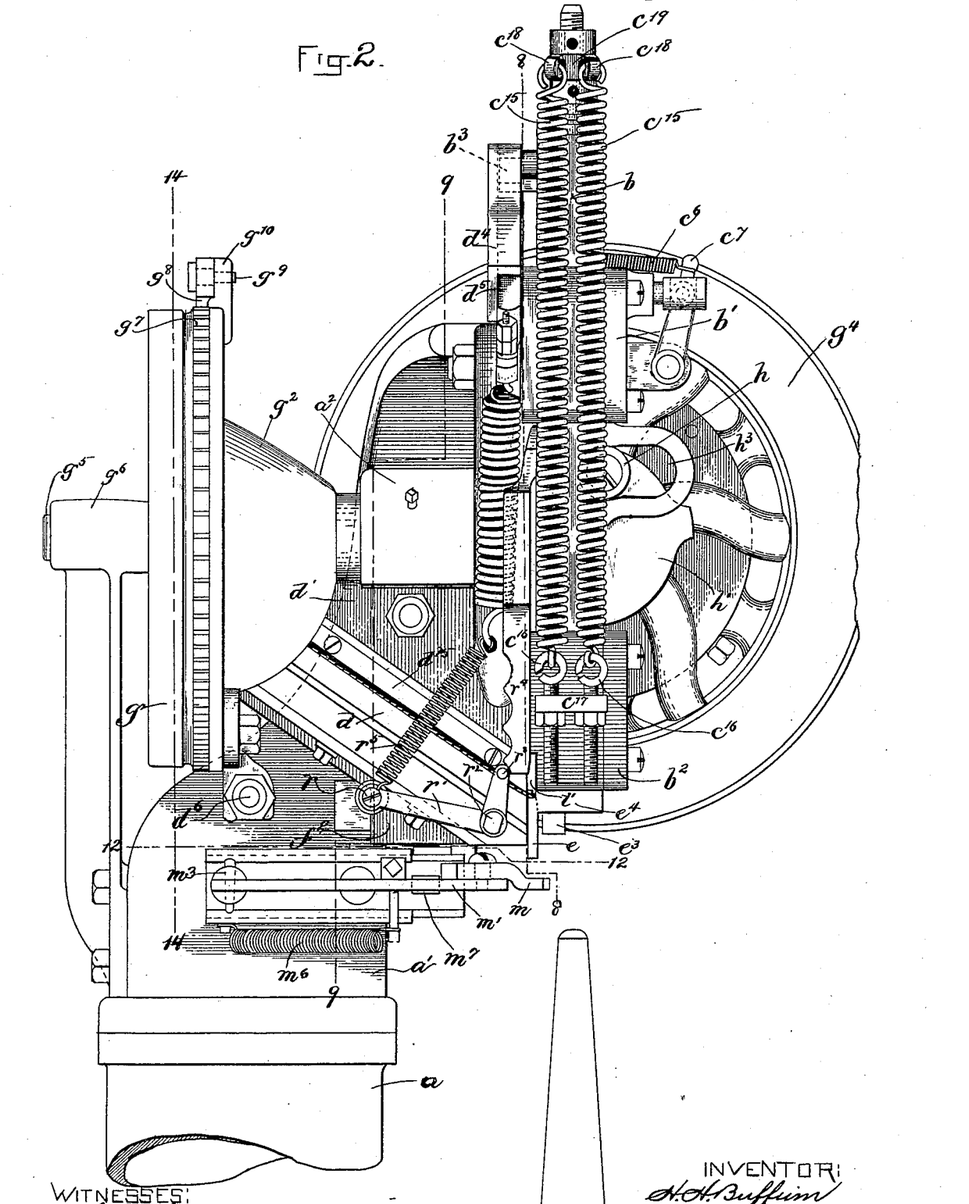
Fig. 2 represents an enlarged side elevation of the main portion of the machine.
Figures 3, 3A:
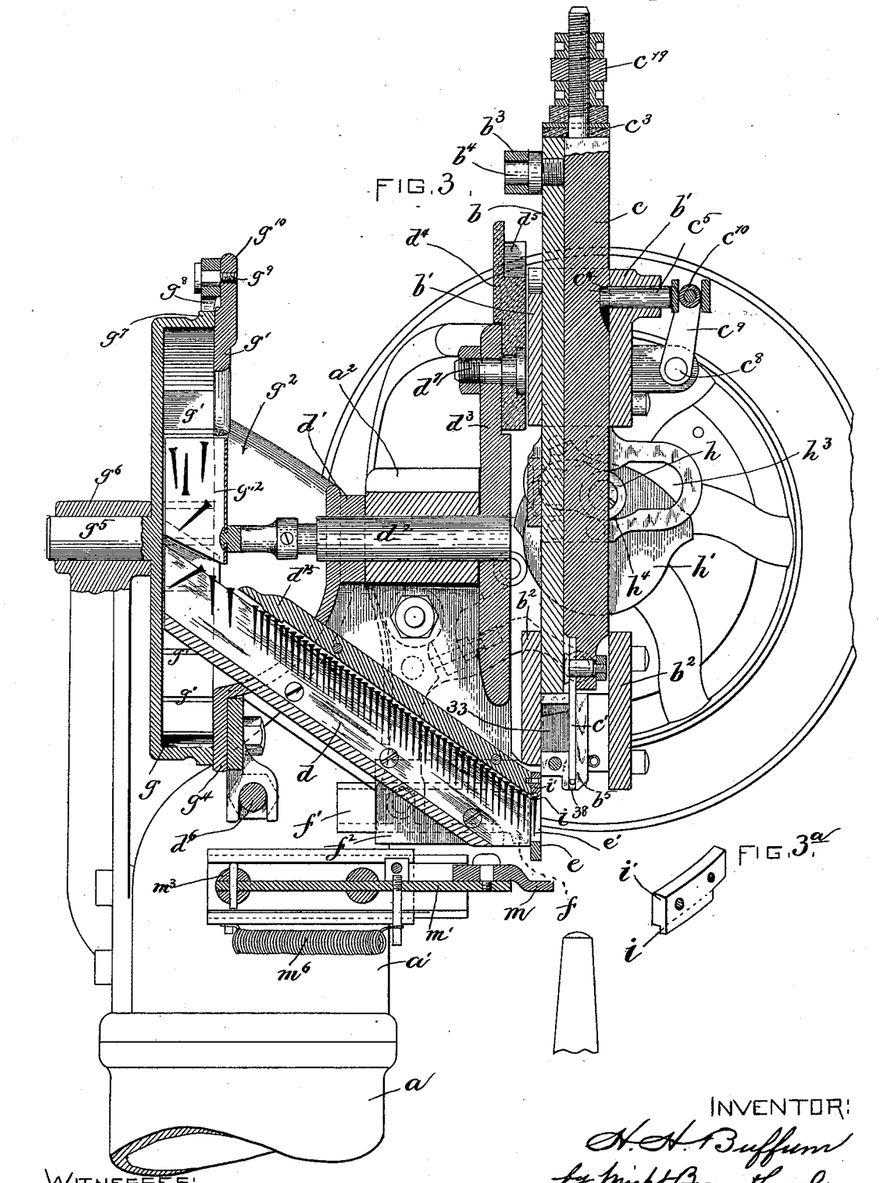
Figure 4:
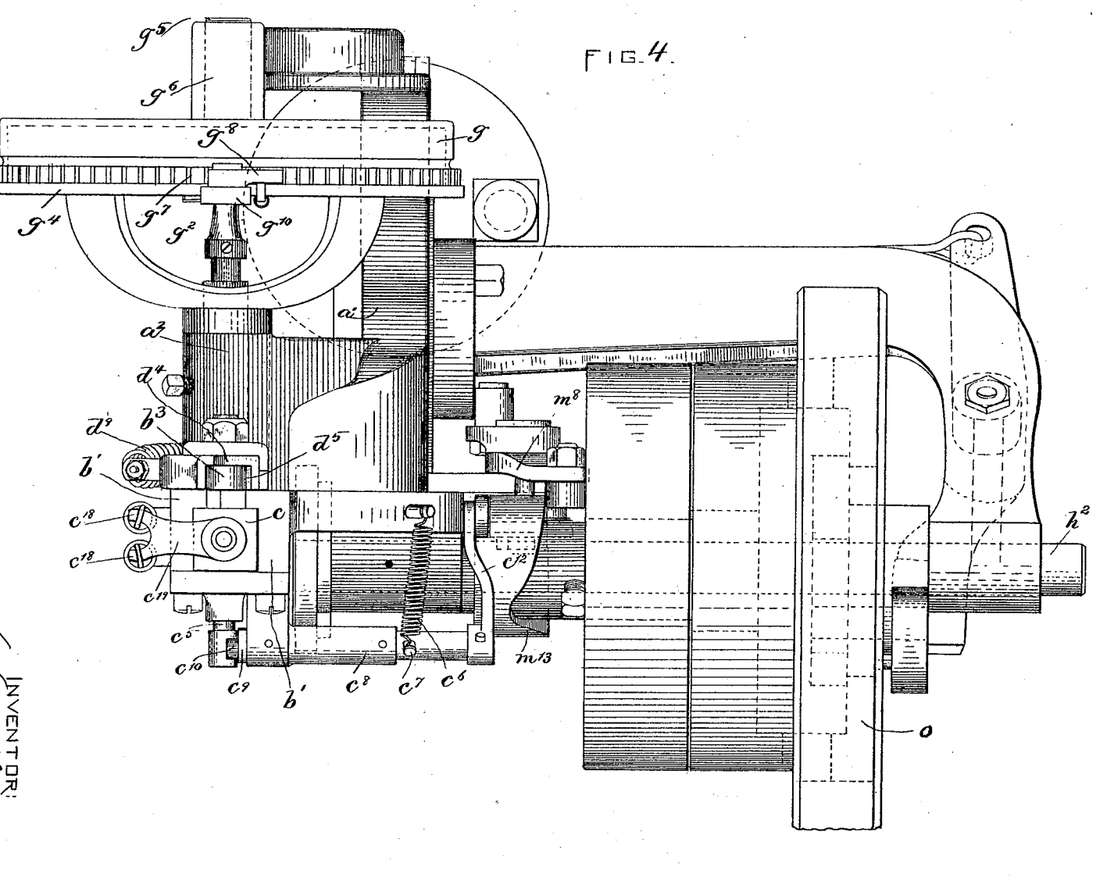
Fig. 4 represents a top view of the machine.
Figures 8, 9, 10:
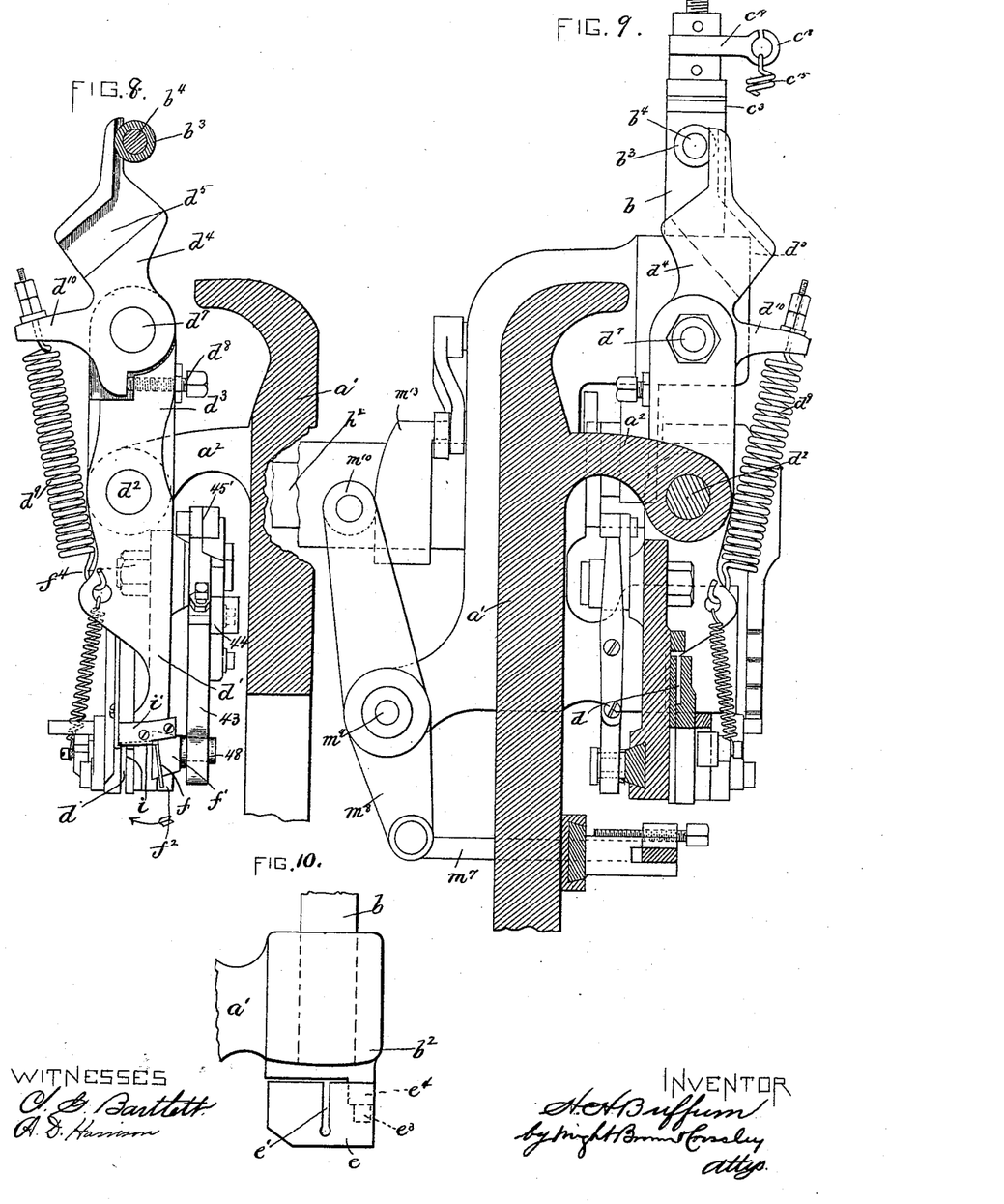
Fig. 8 represents a partial section on line 8 8, Fig. 2, looking toward the left.
Fig. 9 represents a section on line 9 9, Fig. 2, looking toward the right.
Fig. 10 represents an elevation of the fixed nail-receiver and the part of the frame to which it is attached.
Figures 14, 15:
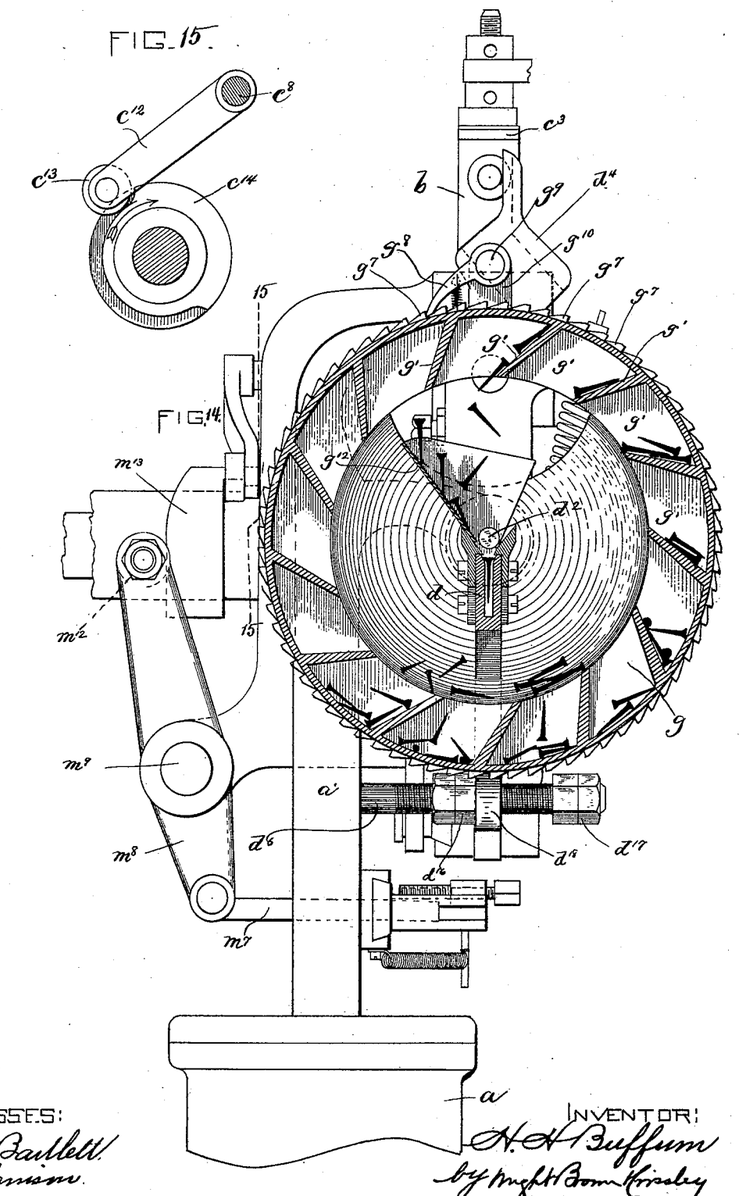
Fig. 14 represents a section on line 14 14, Fig. 2, looking toward the right.
Fig. 15 represents a section on line 15 15, Fig. 14, looking toward the left.

$d$ represents an inclined chute or raceway, which is supported by an oscillating frame $d'$, which is hung and adapted to oscillate upon a horizontal stud $d^2$, which is rigidly affixed to an arm or ear $a^2$ on the head or frame $a'$. Said frame $d'$ and the nail-chute thereon are oscillated by mechanism presently described, the object of the oscillating movement being, first, to present the lowest nail in the raceway to a fixed nail-receiver $e$, formed to receive one nail at a time, the lowest nail dropping by gravitation into a slot or pocket $e'$ in said receiver, and, secondly, to remove the raceway from said slot or pocket, leaving the latter unobstructed, so that the nail left therein can be ejected by a reciprocating ejector $f$, as hereinafter described. The nail-receiver $e$ is a vertical plate rigidly attached to the lower bearing $b^2$, in which the carrier $b$ slides, by means of a screw or bolt $e^3$, passing through an ear $e^4$, formed on the plate $e$. (See Figs. 1, 2, and 10.) The nails are supplied to the chute or raceway from a reservoir $g$, which is of circular form and provided with inwardly-projecting buckets $g'$, Figs. 3 and 14, adapted to receive nails from a mouth or receptacle $g^2$, Figs. 3 and 4, said receptacle being a part of the swinging frame $d'$ and provided with a circular flange $g^4$, Fig. 3, which forms a wall to retain the nails in the buckets until the latter reach such position that the nails are discharged by gravitation, as indicated in Fig. 14. The reservoir $g$ is made in a separate piece from the flange $g^4$, and is provided at its center with a stud $g^5$, which is fitted in a fixed bearing $g^6$ on the supporting-frame. On the periphery of the reservoir $g$ is formed a series of ratchet-teeth $g^7$, Figs. 5 and 14, which are engaged by a pawl $g^8$, pivoted at $g^9$ to an ear $g^{10}$ on the flange $g^4$. The oscillating movements of the frame $d'$, produced as presently described, cause the pawl $g^8$ to impart a step-by-step rotary movement to the reservoir $g$, so that the nails which accumulate in the lower portion of the reservoir are carried upwardly by the buckets thereof until they reach the upper portion, from whence they are discharged by gravitation into a hopper or deflector $g^{12}$, Figs. 3 and 14, which is attached to the fixed stud $d^2$ and guides the nails into the upper end of the chute or raceway. One side of the deflector $g^{12}$ is left open, so that the surplus nails falling into the same may readily escape. The arrangement of the deflector is such that such nails as slide down the latter with their points downward properly enter the raceway, so that the heads of the nails bear upon the upper edges of the walls which constitute the raceway, the shanks of the nails being suspended between said walls, as clearly shown in Figs. 3 and 14. The raceway is provided with a top plate $d^{15}$, which covers the heads of the nails when they are in position to slide down the raceway, as shown in Figs. 2 and 3.

Figures 11, 12, 13:
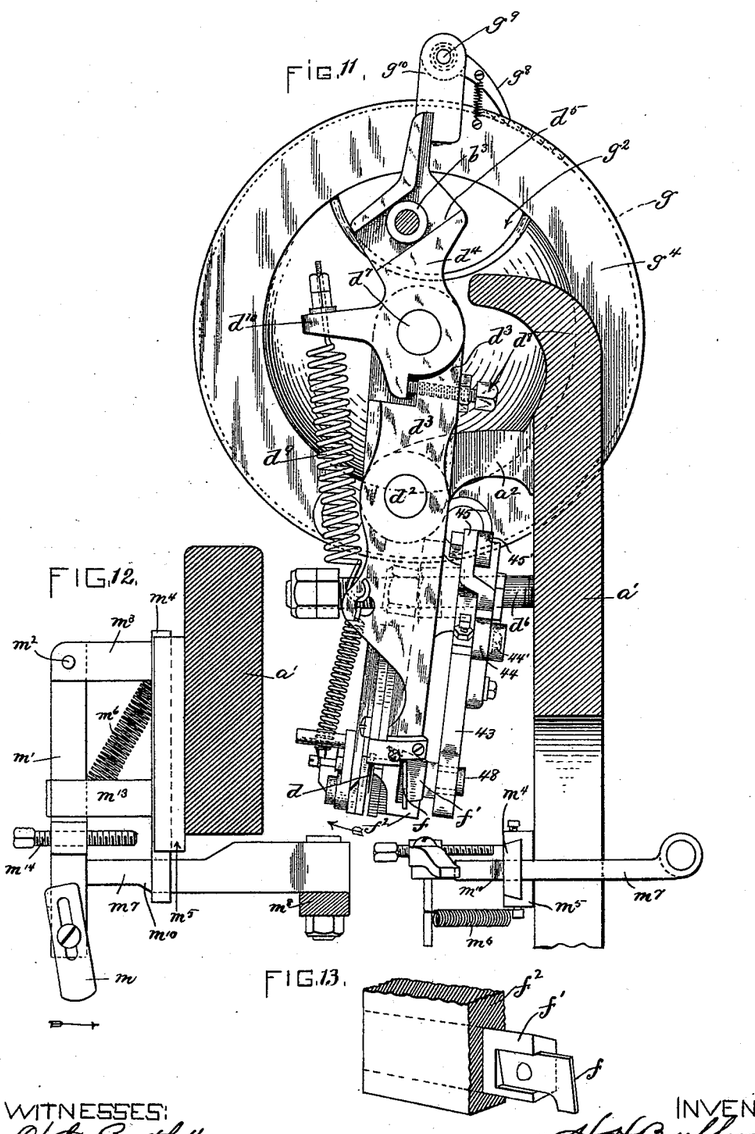
Figures 16, 17, 18, 19:
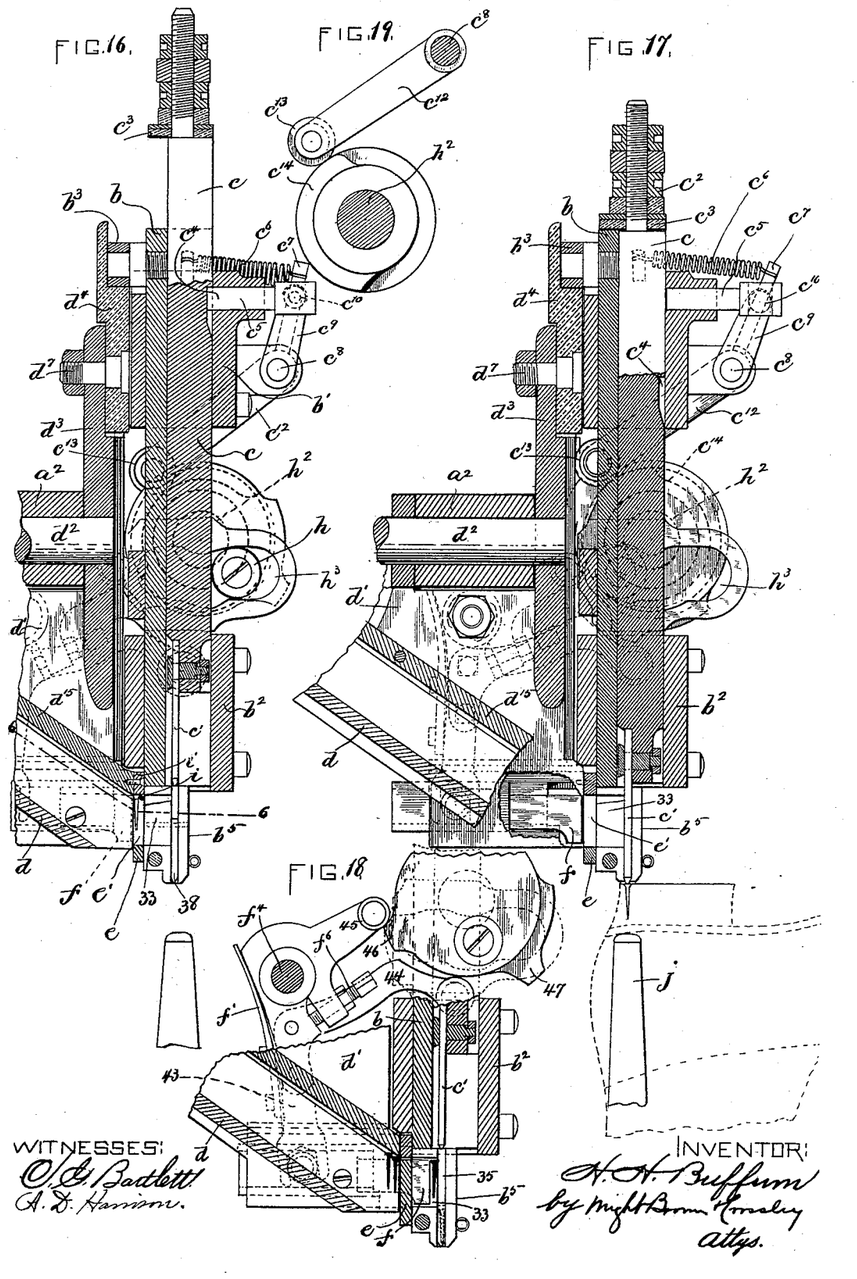
Fig. 16 represents a section similar to Fig. 3, showing the reciprocating carrier depressed instead of raised, as in Fig. 3, the driver being raised.
Fig. 17 represents a similar section in which both the carrier and driver are depressed.
Fig. 18 represents a view similar to the lower portion of Fig. 16, but showing the ejecting device moved forward.
Fig. 19 represents a view similar to Fig. 15, but showing the parts shown in said figure in different positions.
Figures 23, 24, 25, 26, 27, 28, 29, 30:
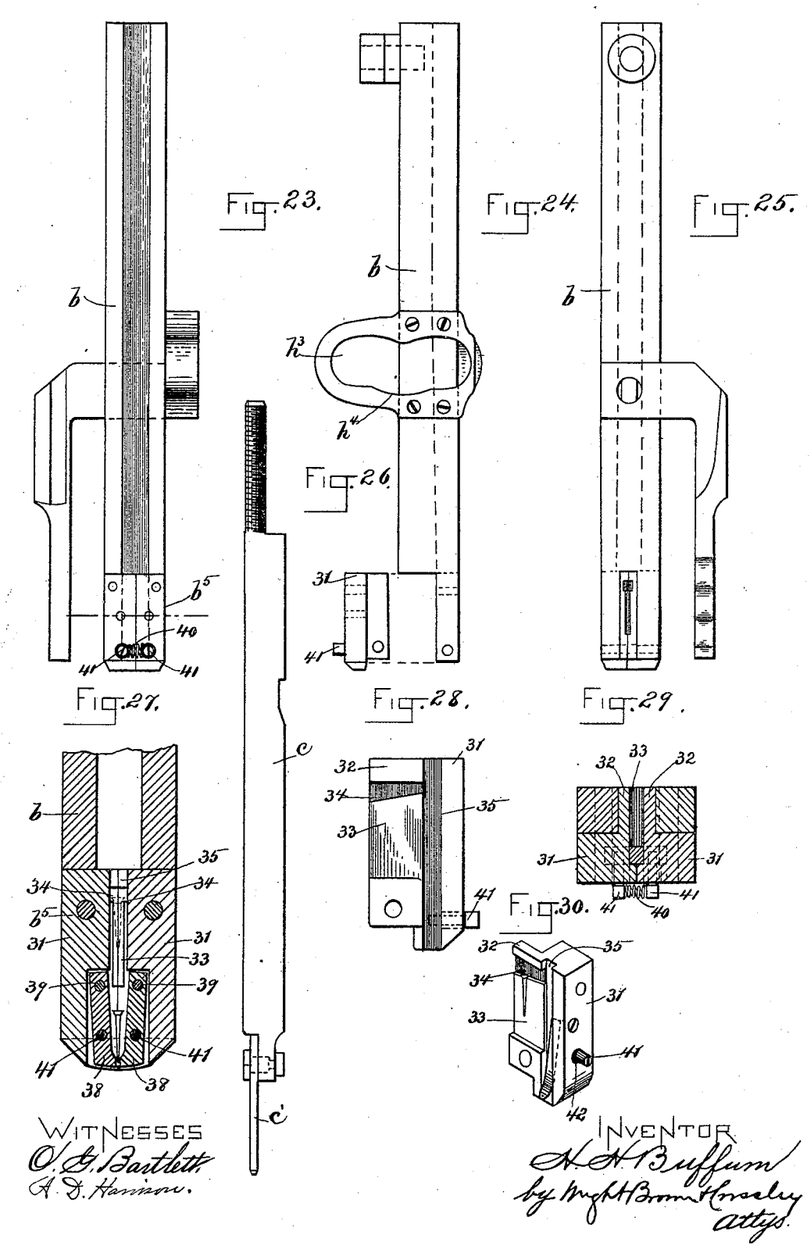

The frame $d'$ and the raceway $d$ are oscillated as follows: The frame $d'$ has an upwardly-projecting arm $d^3$, Figs. 3, 8, and 11, to the upper portion of which is connected an extension $d^4$, in which is formed an inclined groove or way $d^5$, the sides of which co-operate with a trundle-roll $b^3$ on a stud $b^4$, affixed to the carrier $b$. The downward movements of the carrier $b$ cause the roll $b^3$ to bear upon the lower side of said slot or way $d^5$, and thus give the frame $d'$ and the raceway $d$ a lateral movement in the direction indicated by the arrow in Fig. 8 to the position shown in Fig. 11. This movement carries the lower end of the raceway from the position it occupies when it coincides with the nail-pocket $e'$ in the fixed receiver $e$ to a position at one side of said pocket, so that the ejector $f$ can move forward and eject the nail from the pocket $e'$. The upward movement of the carrier $b$ from the position shown in Fig. 11 to that shown in Fig. 8 causes the roll $b^3$ to restore the frame $d'$ to the position shown in Fig. 8, thus again bringing the lower end of the raceway into position to coincide with the nail-receiving pocket $e'$. A stop-screw $d^6$, Figs. 3 and 14, is affixed to the head $a'$ and is provided with two nuts $d^{16}$ $d^{17}$, which are engaged with and adjustable upon its threaded portion. The swinging frame $d'$ is provided with an ear $d^{18}$, loosely surrounding the stop-screw $d^6$. When the frame $d'$ is swung to the position in which the end of the raceway coincides with the pocket $e'$, the ear $d^{18}$, striking against the nut $d^{16}$, will stop its further movement in that direction, and when the frame is swung in the other direction the nut $d^{17}$ will similarly stop its movement. The extension $d^4$, having the slot or way $d^5$, on which the roll $b^3$ acts to oscillate the frame, is connected by a pivot $d^7$ to the arm $d^3$ on the frame $d'$, and is normally held against the stud or stop-screw $d^8$ in the arm $d^3$ by a spring $d^9$, one end of which is attached to the frame $d'$ and the other end to an arm $d^{10}$ on the extension $d^4$. This construction permits a yielding movement of the extension $d^4$ when the roll $b^3$ is being depressed to swing the frame $d'$ in the direction indicated by the arrow in Fig. 8, so that injury to the mechanism is avoided in case there be any obstruction to the movement of the frame $d'$ in said direction. The lower end of the carrier $b$ carries a nail receiving and centering device $b^5$, into which the nails are forced by the ejector $f$ from the fixed pocket $e'$ when the carrier is depressed, so as to bring said receiving and centering device into connection with the said fixed pocket $e'$. The nail receiving and centering device comprises a block or frame made in two sections 31 31, as best shown in Figs. 23 to 30, inclusive, which are provided with lateral flanges 32, projecting into a slot formed in the lower portion of the carrier $b$. Between the flanges 32 is formed a vertical slot 33, the sides of which are provided with shoulders 34 34, arranged to support the head of a nail, as indicated in Figs. 27 and 30, when the nail is pushed into the slot 33 by the ejector $f$. The slot 33 communicates with a vertical channel or way 35, in which the driver $c'$ works. At the lower portion of the vertical channel 35 are two centering-jaws 38, which are adapted to hold the nail centrally for the action of the driver, said jaws being located in recesses in the sections 31 at opposite sides of the driver-receiving channel and pivoted at 39 39. The lower ends of the jaws 38 38 are pressed together lightly by a spring 40, which is connected with studs 41 41, secured to said jaws and projecting outwardly through slots 42 in the sections 31. The inner sides of the jaws are inclined, as shown in Fig. 27, so that their lower ends are adapted to arrest the lower portion of the nail-shank and hold the nail in a central position during the very brief time that elapses between the insertion of each nail into the channel 35 and the descent of the driver, the jaws yielding to permit the nail to pass between them when the driver descends. The shoulders 34, which support the heads of the nails, are preferably inclined, as shown in Figs. 28 and 30, so that as the nails are pushed into the slot 33 by the ejector $f$ there will be no liability of their moving forward accidentally into the vertical driver-receiving channel 35, the inclination of the shoulders 34 requiring positive pressure to insert the nails in the said channel. The carrier $b$ is reciprocated vertically in the guides $b'$ $b^2$ by means of a trundle-roll $h$ on a cam $h'$, which is affixed to a positively-rotated shaft $h^2$, said shaft being the main shaft of the machine and giving motion to all the operative parts thereof. The roll $h$ enters the slot $h^3$, formed in a piece or plate affixed to the carrier $b$. The engagement of the roll $h$ with the slot $h^3$ causes the revolving movement of said roll by the rotation of the shaft $h^2$ to alternately raise and lower the carrier $b$. The central portion of the slot $h^3$ is curved, as shown at $h^4$, Figs. 3 and 23, said curved portion being formed and arranged to permit the carrier to remain at rest during a part of the rotation of the shaft $h^2$ when the carrier is at its lowest point, as shown in Figs. 16 and 17, time being thus afforded for the insertion of a nail into the slot 33 of the nail receiving and centering device and for the operation of the driver while the carrier is depressed.

The driver-bar $c$ is operated as follows: When the carrier $b$ is raised from the position shown in Figs. 16 and 17 by the revolution of the trundle-roll $h$, it raises with it the driver-bar $c$, the latter having a washer or collar $c^3$ on its upper portion, which, when the driver is depressed, bears upon the upper end of the carrier $b$. The washer or collar $c^3$ is preferably of elastic material to serve as a cushion or buffer when the driver-bar is depressed. The described upward movement of the carrier $b$ and the driver-bar $c$ brings a notch or recess $c^4$, Figs. 3, 16, and 17, in the driver-bar into engagement with a locking pin or detent $c^5$, which is adapted to slide horizontally in an orifice in the guide $b'$. Said detent is normally pressed inwardly, so as to automatically engage the notch $c^4$ by means of a spring $c^6$, Figs. 1, 16, and 17, which is attached at one end to a fixed support and at the opposite end to an arm $c^7$, affixed to a rock-shaft $c^8$, which is journaled in bearings on the supporting-frame, and is provided with an arm $c^9$, having at its outer end a stud or roll $c^{10}$, which enters a groove in the head of the detent $c^5$. To the rock-shaft $c^8$ is affixed an arm $c^{12}$, which is provided with a trundle-roll $c^{13}$, which is held by the stress of the spring $c^6$ against a cam $c^{14}$ on the driving-shaft $h^2$. The combined action of the cam and spring oscillates the rock-shaft $c^8$ and its arm $c^9$, thus alternately moving the detent $c^5$ in and out. The detent is moved inwardly and pressed against the driver-bar while the latter is being raised and engages the notch $c^4$ and arrests the driver-bar in its raised position, as shown in Fig. 3. The driver-bar is held thus raised until the cam $c^{14}$ in its rotation moves the rock-shaft $c^8$ through the lever $c^{12}$ in the direction required to retract the detent $c^5$, the driver-bar being thus released. When the driver-bar is released, as above described, it is forcibly depressed, so as to cause the driver $c'$ to drive a nail by means of two springs $c^{15}$ $c^{15}$, attached at their lower ends to adjustable eyebolts $c^{16}$ $c^{16}$, secured to an ear $c^{17}$ on the lower fixed guide $b^2$, and at their upper ends to ears $c^{18}$ on an arm $c^{19}$, attached to the driver-bar. The ejector $f$ is a thin metal plate attached to a dovetailed slide $f'$, which is fitted to move in a guide $f^2$, attached to the swinging frame $d'$. Said ejector is reciprocated by means of a lever $f^3$, having three arms 43, 44, and 45, Fig. 5. Said lever is mounted to oscillate upon a stud $f^4$, affixed to the frame $d'$, and its arms 44 and 45 are arranged to be acted on by two projections 46 and 47, Fig. 5, on the cam $h'$. The other arm 43 is provided with a slot or recess which receives a stud or roller 48 on the slide $f'$. The cam projections 46 and 47 and the lever-arms 44 and 45 are arranged in different planes, the projection 46 being arranged to act on the arm 45, while the projection 47 is arranged to act on the arm 44. The cam projections act alternately, and when the projection 46 engages a trundle-roll 45' on the arm 45 it moves the lever $f^3$ in the direction required to move the slide $f'$ forward and force the ejector into the nail receiving and centering device, as shown in Fig. 18, this movement occurring when the carrier $b$ is depressed and the nail-raceway moved laterally to the position shown in Fig. 11 to cause its lower end to clear the fixed nail-pocket $e'$. The projection 47 acts immediately after the projection 46, and by striking a trundle-roll 44' on the arm 44 moves the lever $f^3$ in the opposite direction, thus moving the slide $f'$ backwardly and withdrawing the ejector $f$ from the nail receiving and centering device and from the fixed pocket $e'$. The arm 45 is adapted to move independently of the arms 43 and 44 to a slight extent, it being made in a separate piece, which is adapted to turn independently on the stud $f^4$. A spring $f^5$, attached to the arm 43 and bearing at its free end upon the arm 45, normally holds a stop-screw $f^6$ in an ear on the arm 45 against a seat or abutment on the arm 43. This construction permits the arm 45 to yield during the forward movement of the ejector, so that if there should happen to be an obstruction in the way of the ejector the arm 45 would yield to allow the ejector to be arrested by such obstruction, so that there would be no damage to any of the parts, as there might be if the forward movement of the ejector were positive. The cam projections 46 and 47, which do not partake of the oscillating movements of the frame $d'$, must be sufficiently wide to keep them in operative relation to the arms 44 and 45, which, being carried by the frame $d'$, oscillate with it.

Figures 5, 6, 7:
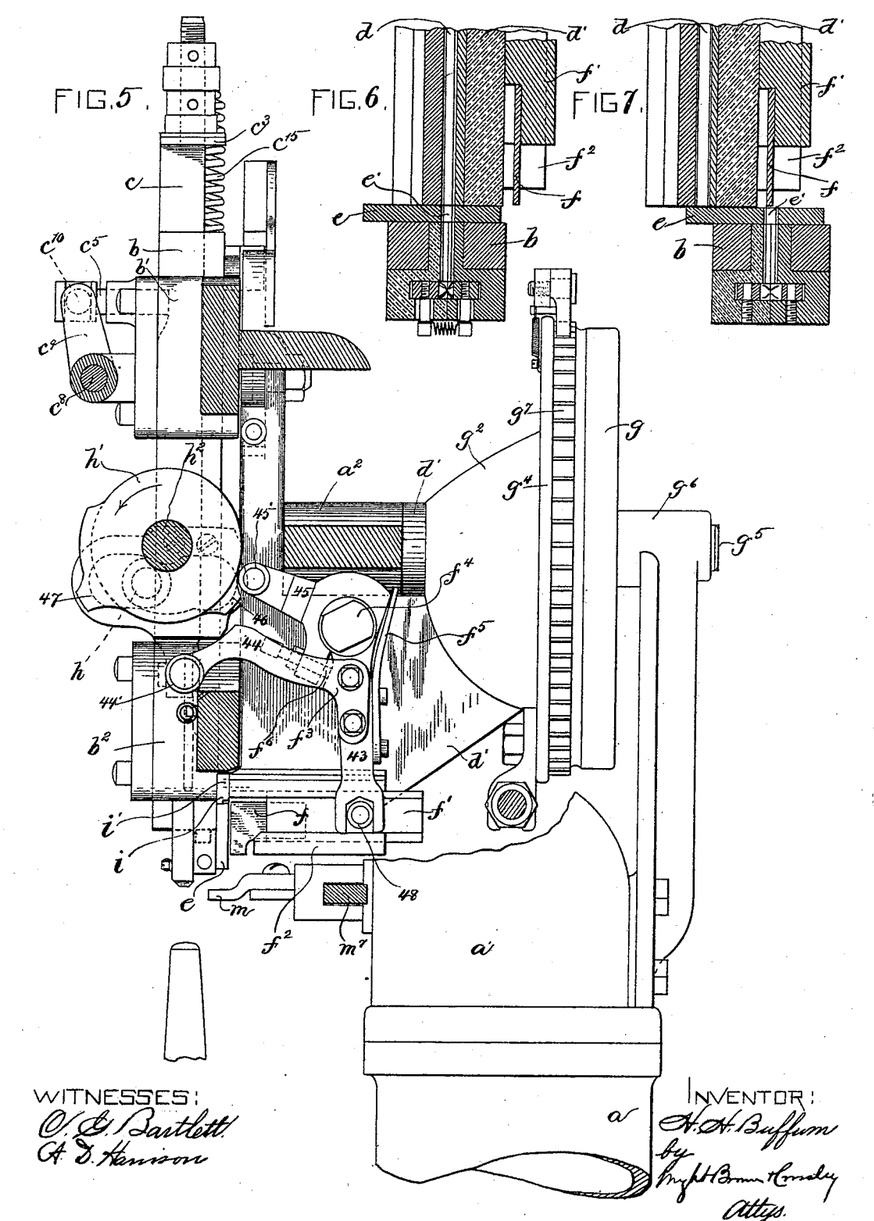
Fig. 5 represents a section on line 5 5, Fig. 1, also on an enlarged scale, looking toward the right.
Figs. 6 and 7 represent sections on the line 6 6, Fig. 16, the parts being shown in different positions in said figures.

The operation of the mechanism above described is as follows: The swinging frame $d'$ being in the position shown in Figs. 8 and 9, so that the lower end of the raceway coincides with the nail-receiving pocket $e'$ in the fixed plate $e$, the lowest nail in the raceway drops into said pocket by gravitation, as indicated in Fig. 3. The nail thus received by the pocket $e'$ is supported in said pocket by the engagement of its head with the shoulders at the sides of the pocket, the head resting on said shoulders in the same manner that it rests on the edges of the raceway. The nail is prevented from falling laterally out of the pocket by means of a downwardly-projecting lip or flange $i$ on a plate $i'$, affixed to the lower end of the raceway. (See Figs. 3, 3ª, 8, and 11.) The lip $i$ is shorter than the plate $i'$ and is of such length that when the raceway is moved laterally from the position shown in Figs. 6 and 8 to that shown in Figs. 7 and 11 said lip will leave the pocket $e'$, so that the upper end of said pocket will be unobstructed to permit the nail therein to move laterally into the slot 33 of the nail receiving and centering device, said lateral movement being effected by the forward movement of the ejector $f$, which takes place while the raceway is moved laterally to the position shown in Figs. 7 and 11. Prior to the forward movement of the ejector the carrier $b$ is depressed, as shown in Figs. 16, 17, and 18, so that the slot 33 of the nail receiving and centering device coincides with the fixed nail-pocket $e'$. Hence the forward movement of the ejector forces the nail from the pocket $e'$ into said slot 33, the ejector being formed to pass through said pocket and into the slot, as shown in Fig. 18. The ejector is arranged to force the nail into the driver-channel 35 at a point above the centering-jaws 38, the nail dropping between said jaws to the position shown in Figs. 18 and 27. After the nail has been thus deposited between the jaws 38 38 the driver, which up to this point had been arrested in its raised position by the detent $c^5$, as shown in Figs. 3 and 16, is released by the withdrawal of said detent and is forcibly depressed by the springs $c^{15}$, thus causing the driver to drive the nail into the boot or shoe, which is supported under the nail receiving and centering device by a horn $j$, as shown in Fig. 17. After the driving of the nail the carrier $b$ is raised to the position shown in Fig. 3, carrying with it the nail receiving and centering device and the driver-bar, the latter being engaged when it reaches the highest point in its movement by the detent $c^5$, as already described, so that it is ready to give the next nail-driving blow. The raceway is moved back to the position shown in Figs. 6, 7, and 8 after the driving of the nail and deposits another nail in the pocket $e'$, when the operation is again repeated, and so on. It will be remembered that the oscillating movement of the frame $d'$, which carries the raceway into and out of line with the fixed pocket $e'$, also, through the pawl $g^8$, which oscillates with said arm, gives the nail-reservoir a step-by-step rotation in the manner above described, so that there is a constant discharge of nails from the buckets of said reservoir into the hopper or deflector $g^{12}$, so that the raceway is kept supplied with nails. The fixed plate $e$, in which the nail-pocket $e'$ is formed, obstructs the lower end of the raceway, as shown in Figs. 7 and 18, when the latter is moved away from the position shown in Figs. 6 and 8, so that the lowest nail in the raceway cannot escape until the lower end of the raceway is again brought into line with the pocket $e'$ by the return movement of the raceway to the position shown in Figs. 6 and 8.

To prevent the nails from binding in the raceway while they are sliding down the same, I provide a hammer $r$, Fig. 2, arranged to strike a rapid succession of light blows upon the bottom of the raceway, and thereby sufficiently jar the latter to prevent binding of the nails therein. Said hammer is formed on a bell-crank lever $r'$, which is pivoted at $r^2$ to the raceway. One arm of said lever has a stud $r^3$, which bears against a plate $r^4$, having a wavy or undulating edge attached to the carrier $b$. A spring $r^5$, attached at one end to a part of the supporting-frame and at the other end to one arm of the lever $r'$, normally pulls the hammer against the bottom of the raceway and holds the other arm of the lever $r'$ against the undulating edge of the plate $r^4$. It will be seen that the vertical movements of the carrier $b$ cause the plate $r^4$, which moves with said carrier, to vibrate the lever $r'$, thus causing the hammer to strike a succession of blows upon the raceway. It will be observed that the driver-bar is raised by the upward movement of the carrier $b$, said carrier and the mechanism that operates it affording a simple and efficient means for elevating the driver-bar and preparing it for its next descent.

Figures 1, 1A:
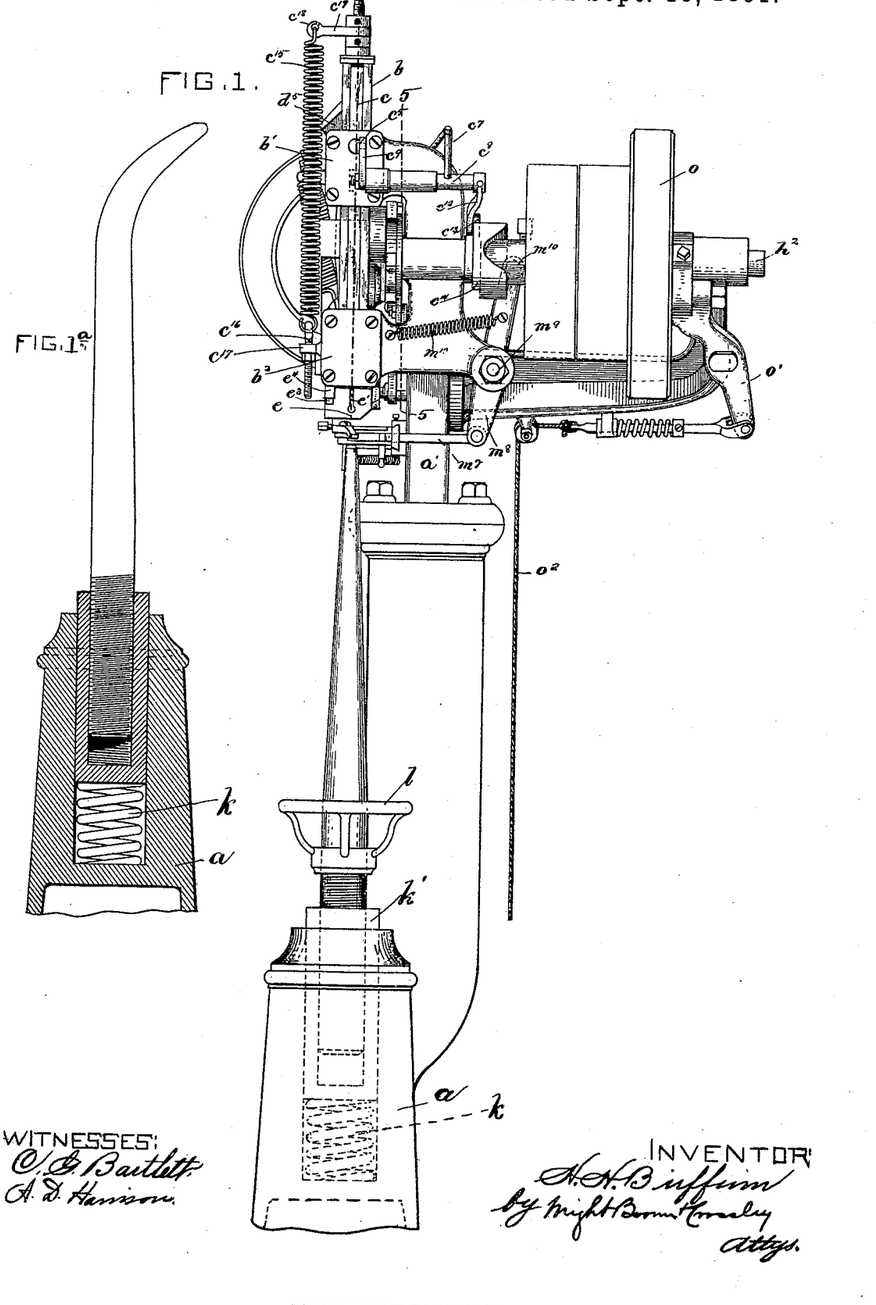

The horn $j$, which supports the work, is supported by the supporting base or pedestal $a$, and is preferably adapted to yield by means of a spring $k$, Figs. 1 and 1ª, inserted in a socket in the pedestal, so that the work can yield somewhat to the blow of the driver, although not freely, the spring $k$ being quite stiff and strong. The horn is vertically adjustable, so that its supporting end may be raised or lowered to provide a suitable distance between it and the lower portion or throat of the nail receiving and centering device, said distance varying with the thickness of the work. The adjustment of the horn is preferably accomplished by screw-threading its lower portion and engaging its said screw-threaded portion with an internally-threaded socket $k'$, which bears on the spring $k$ and is adapted to move vertically in the socket in the pedestal. In Fig. 1 I have shown the horn as provided with a hand-wheel $l$, which is rigidly attached to the horn and enables the operator to readily rotate it for the purpose of adjustment. The horn shown in Fig. 1 is straight; but, if desired, a horn which is curved at its upper portion, as shown in Fig. 1ª, may be used.

The machine is provided with a feeding device, which consists of a dog $m$, Figs. 2, 3, 5, 11, and 12, attached to a lever $m'$, which is pivoted at $m^2$ to an arm $m^3$, attached to and projecting laterally from a slide $m^4$, which is adapted to move in fixed horizontal guides $m^5$ on the supporting-frame. The dog $m$ is enabled by the slide $m^4$ to move forward and backward to a slight extent and is moved in one direction by a spring $m^6$. The pivotal connection of the lever $m'$ to the arm $m^3$ enables the dog $m$ to swing laterally. The spring $m^6$ is arranged diagonally, so that it has a tendency to move the dog in the direction indicated by the arrow in Fig. 12. The dog is moved positively in an opposite direction by means of a sliding arm $m^7$, which is adapted to move in a slot in the arm $m^4$, and is pivoted at one end to the lower end of a lever $m^8$, Fig. 1, which lever is pivoted at $m^9$ to the supporting-frame and has at its upper end a trundle-roll $m^{10}$, which is held by a spring $m^{12}$ against the face of a cam $m^{13}$ on the shaft $h^2$. The rotation of the cam $m^{13}$ causes the lever $m^8$ to oscillate, and thus alternately move the dog in one direction and permit the spring $m^6$ to move it in the opposite direction. The arm $m^7$ has an incline $m^{10}$ on its front edge. When the arm is moving toward the right from the position shown in Fig. 12, said incline permits the slide $m^4$ to be moved backwardly a distance equal to the depth of the incline, the spring at the same time moving the dog in the direction indicated by the arrow. The dog is thus moved backward and sidewise simultaneously. When the arm $m^7$ is moved in the opposite direction, the incline $m^{10}$ in passing through the slide $m^4$ moves the same outwardly, the end of the arm at the same time moving the lever $m'$ and dog $m$ in a direction opposite that indicated by the arrow, the dog being thus given a positive work-feeding movement while projected. The length of the feed movement may be varied by means of an adjustable screw $m^{14}$, which is inserted in the lever $m'$ and bears on the slide $m^4$ when the lever has moved far enough in one direction. The dog is thus caused to feed the work, which is held against it by the operator, aided by the horn. I do not limit myself to this form of feed mechanism, but may use any other suitable mechanism for the same purpose.

Figures 20, 21, 22:
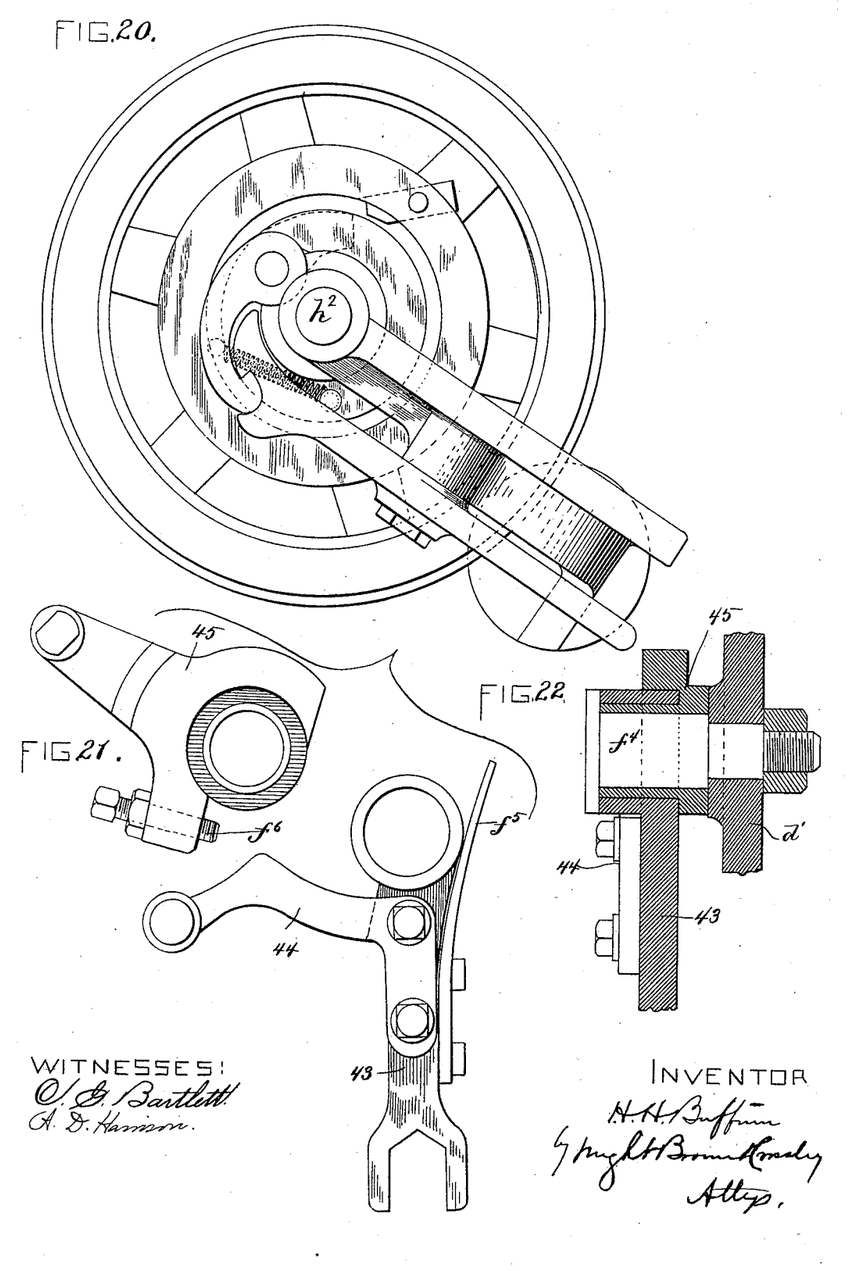
Fig. 20 represents a view of the automatic stop-motion.
Figs. 21 to 30, inclusive, represent detail views of parts hereinafter mentioned.

The driving-shaft $h^2$ is rotated by a pulley $o$, which is normally loose upon the shaft and is continuously rotated by a belt connecting it with a suitable driving-shaft, an automatic stop-motion being provided, preferably of the construction shown in Fig. 20, to disconnect the driving-pulley from the shaft $h^2$ at the end of each complete rotation of the latter, so that the shaft is stopped after each descent and ascent of the driver, the shaft being stopped when the driver $c$ and carrier $b$ are raised and requiring an act of the operator to again set it in motion. A lever $o'$, forming a part of the automatic stop-motion above described, is connected by a cord or chain $o^2$ with a treadle, (not shown,) which is conveniently arranged to be depressed by the operator whenever it is desired to start the machine in operation, the depression of said treadle causing the lever $o'$ to connect the pulley $o$ positively with the shaft $h^2$.

My invention is not limited to the details of mechanism here shown and described, and the same may be variously modified in numerous respects without departing from the nature and spirit of the invention.

An important part of my invention is the vertically-movable carrier, which not only elevates the driver-bar, but also raises and lowers the throat or nail receiving and centering device through which the nails are driven into the work. By thus raising and depressing the said throat I obtain two new and very desirable results—viz., first, I afford ample room for the application of the work to the horn when the carrier and throat are raised, and, secondly, I enable the throat to descend upon the work and hold it upon the horn after the manner of a presser-foot while the nail is being driven. The carrier and throat are depressed before the descent of the driver, so that the work is firmly clamped between the throat and horn, the parts or pieces of material, as the upper and inner and outer soles, being compressed by the throat and horn while the nail is being driven and clinched. Hence a very firm and close connection is effected.

It will be seen that the yielding movement of the horn prevents damage in case the work is too thick for the adjustment of the horn; but the spring supporting the horn is so stiff that the compression of the material is not affected by the yielding of the horn.

When the machine is used for nailing or slugging heels, the throat and horn compress the heel-lifts prior to the driving of the nails or slugs; but in such case the nails will not be clinched.

I claim—

1. In a nail-driving machine, the combination, substantially as set forth, of a vertically-movable nail-holding throat or receiver, a carrier supporting the same, means for raising and depressing the carrier to alternately elevate the throat above its operative position and restore it thereto, a driver-bar which, when depressed, is supported by said carrier and is raised by the upward movement of said carrier, and automatic means for locking the driver-bar to the fixed frame of the machine in the raised position of said bar and for automatically releasing the same to permit the operation of the driver, as set forth.

2. In a nail-driving machine, the combination of a nail-raceway, means for oscillating the same laterally, a fixed pocket formed and arranged to receive a nail from the lower end of the raceway when the latter is in a given position, guides attached to the raceway at one side of the nail-conducting passage therein, an ejector movable in said guides, and means for reciprocating said ejector to cause it to enter the fixed pocket and eject the nail therefrom when the raceway is in a different position, as set forth.

3. In a nail-driving machine, the combination of the inclined nail-raceway, means for oscillating the same laterally, a fixed plate at the lower end of the raceway having a nail-receiving pocket which registers with the raceway and receives a nail therefrom when the raceway is in a given position, said plate covering the lower end of the raceway when the latter is moved from said position, a lip $i$, attached to the raceway and formed to project over the said pocket and retain a nail therein when the raceway is in position to register with said pocket, the said lip being removed from the pocket when the raceway is moved away from its registering position, and a reciprocating ejector arranged to eject the nail from said pocket when the said lip is removed therefrom, as set forth.

4. In a nail-driving machine, the combination of the inclined nail-raceway, the pivoted frame supporting the raceway, means for oscillating said frame on its pivot, the nail-reservoir mounted to rotate about the upper end of the raceway on a fixed bearing and provided with an opening in one side receiving the upper end of the raceway, a pawl connected to the oscillating frame, and a ratchet connected with the reservoir and engaged with said pawl, whereby the oscillating movements of the frame are caused to rotate the reservoir step by step, as set forth.

5. In a nail-driving machine, the combination of the inclined nail-raceway, the pivoted frame supporting the raceway, means for oscillating said frame on its pivot, the circular nail-reservoir having internal buckets arranged to rotate about the upper end of the raceway, a fixed bearing for said reservoir, and connections between the reservoir and the oscillating frame, whereby the reservoir is rotated by the movements of the frame, as set forth.

6. In a nail-driving machine, the combination of the inclined nail-raceway, the oscillating frame supporting the raceway, the circular nail-reservoir having internal buckets arranged to rotate about the upper end of the raceway and a side opening receiving the upper end of the raceway, connections between the reservoir and the oscillating frame, whereby the reservoir is rotated by the movements of the frame, and a hopper or deflector arranged within the circle of buckets over the upper end of the raceway and adapted to guide the nails dropping from the buckets into the raceway, as set forth.

7. In a nail-driving machine, the combination of the inclined nail-raceway, the oscillating frame supporting the same, the nail-hopper or mouth formed on said frame and provided with a circular flange $g^4$, which is concentric with the axis on which the frame oscillates, the upper portion of the raceway entering said hopper, the circular reservoir adapted to rotate in a fixed bearing which is in line with the axis of the frame, said reservoir having a series of internal buckets the outer sides of which are closed by the fixed flange $g^4$, and a pawl supported by said flange and oscillated therewith, said pawl engaging ratchet-teeth on the reservoir, as set forth.

8. In a nail-driving machine, the combination of the nail-raceway, the oscillating frame supporting the raceway, a vertically-reciprocating carrier having at its lower portion a nail receiving and centering device, means for moving said carrier up and down, connections between said carrier and frame, whereby the frame and raceway are oscillated by the movements of the carrier, means for transferring nails one at a time from the raceway to the nail-receiving device when the latter is depressed, and a driver adapted to drive the nails, as set forth.

9. In a nail-driving machine, the combination of the nail-raceway, the oscillating frame supporting the raceway, a vertically-reciprocating carrier having at its lower portion a nail receiving and centering device, means for moving said carrier up and down, connections between said carrier and frame, whereby the frame and raceway are oscillated by the movements of the carrier, a fixed plate having a nail-receiving pocket which registers with the lower end of the raceway when the latter is at one extreme of its movement and with the nail-receiving device of the carrier when the latter is depressed, an ejector carried by the raceway and arranged to enter the fixed pocket when the raceway is out of register therewith, means for moving said ejector to cause it to enter said pocket and force a nail therefrom into the nail-receiving device of the carrier, and a device adapted to drive the nails thus supplied to the said nail-receiving device, as set forth.

10. In a nail-driving machine, the combination of the nail-raceway, the oscillatory frame supporting the raceway and provided with an arm having an inclined slot or way, the vertically-reciprocating carrier provided at its upper end with a stud or roll adapted to co-operate with said inclined slot in oscillating the frame and raceway and at its lower end with a nail-receiving device, means for transferring nails one at a time from the raceway to the said nail-receiving device when the latter is depressed, and a driver adapted to drive the nails thus inserted in said receiving device, as set forth.

11. In a nail-driving machine, the combination of the inclined raceway, the swinging frame supporting the raceway, means for oscillating said frame and raceway, a fixed plate having a nail-receiving pocket arranged to register with the raceway when the latter is at one extreme of its movement, an ejector carried by a slide fitted to move in a guide which moves with the raceway, the three-armed lever pivoted to the swinging frame and engaged with the ejector-slide, and the cam projections 46 47 on the driving-shaft, arranged to act on said lever and through the latter give the ejector a back-and-forth movement, as set forth.

12. In a nail-driving machine, the combination of the swinging frame, the raceway attached thereto, the arm $d^3$ on said frame, the extension $d^4$, pivoted to said arm and provided with the inclined slot or way $d^5$, the vertically-reciprocating carrier having a stud or roll $b^4$ adapted to co-operate with said inclined slot, and a spring $d^9$, arranged to hold the extension $d^4$ yieldingly against a stop on the arm $d^3$, whereby a yielding movement is imparted to the frame and raceway in one direction, as set forth.

13. In a nail-driving machine, the combination of the ejector, its carrying-slide, the lever $f^3$, composed of the rigidly-connected arms 43 44 and the pivoted arm 45, the cam projections arranged to act alternately on the arms 44 and 45, and a spring which yieldingly holds the arm 45 against a stop on the other part of the lever, whereby a forward yielding movement is imparted to the ejector, as set forth.

14. In a nail-driving machine, the combination of the carrier, means for reciprocating it vertically in fixed guides, a nail-receiving device attached to the lower end of the carrier, means for inserting a nail in said device when the carrier is depressed, a driver-bar fitted to move vertically in the carrier and provided with a driver and with an operating spring or springs, the stress of which is supported by the carrier when the driver-bar is depressed, the driver-bar being raised from its depressed position by the upward movement of the carrier, a detent engaged with a fixed support and adapted to arrest the driver-bar when it has been raised by the carrier, so that the next depression of the carrier will leave the driver-bar in its raised position, and means for retracting said detent and releasing the driver-bar after the insertion of a nail into the nail-receiving device of the carrier, as set forth.

15. In a nail-driving machine, the combination, with the vertically-reciprocating carrier, of the driver-bar adapted to slide vertically therein, the depressing spring or springs for said driver-bar, a fixed guide in which the carrier and driver-bar are vertically movable, the detent $c^5$, adapted to slide in an orifice in said guide, a rock-shaft connected with said detent, and means for oscillating said rock-shaft to alternately project and withdraw the detent, the latter being thus engaged with and disengaged from the driver-bar, as set forth.

16. In a nail-driving machine, the combination of the supporting-frame, a shaft mounted in bearings on said frame and provided with an eccentrically-arranged stud or roll $h$, the carrier fitted to move vertically in fixed guides on said frame, and an ear or plate attached to said carrier and provided with a slot $h^3$, having a curved portion $h^4$, said slot receiving the stud or roll $h$, the latter reciprocating the carrier and holding it at rest while passing through the curved portion $h^4$, as set forth.

17. In a nail-driving machine, the nail receiving and centering device having the nail-receiving slot 33, the vertical driver-receiving channel 35, communicating with said slot, and the spring-pressed nail-centering jaws in said channel below the slot 33, as set forth.

18. In a nail-driving machine, the nail receiving and centering device having the nail-receiving slot 33, the nail-head-supporting shoulders on the sides of said slot, the vertical driver-receiving channel 35, and the yielding centering-jaws in said channel below the slot 33, combined with means for inserting nails in said slot and a driver adapted to drive said nails from between the centering-jaws, as set forth.

19. In a nail-driving machine, the combination, with the vertically-reciprocating carrier, of the nail receiving and centering device composed of the sections 31 31, attached to the lower end of the carrier and provided with the shouldered nail-receiving slot 33, the driver-receiving channel 35, and the jaws 38, pivoted at their upper ends to said sections and pressed inwardly at their lower ends by a spring, as set forth.

20. In a nail-driving machine, the combination of the raceway, the lever $r'$, pivoted thereto, one arm of said lever having a hammer $r$ arranged to strike the raceway, a reciprocating corrugated plate in contact with the other arm of said lever, and a spring which presses said arm against the corrugated plate, as set forth.

21. In a nail-driving machine, the combination, with the supporting-frame and nail-driving mechanism thereon, of the work-feeding device consisting of a slide $m^4$, fitted to move in guides on the supporting-frame, an arm or lever pivoted at one end to a stud on said slide, a feed-dog $m$ on the swinging end of said lever, a spring $m^6$, which normally retracts said dog and gives it a lateral movement in one direction, a positively-reciprocated slide $m^7$, movable in the slide $m^4$ and provided with an incline $m^{10}$, which, in co-operation with the spring $m^6$, moves the slide forward and backward, one end of said slide bearing on the lever $m'$, all arranged and operating substantially as described.

In testimony whereof I have signed my name to this specification, in the presence of two subscribing witnesses, this 15th day of October, A. D. 1890.

HERBERT H. BUFFUM.

Witnesses:
EWING W. HAMLEN,
A. D. HARRISON.